(12) United States Patent
Gupta et al.

(10) Patent No.: US 10,885,040 B2
(45) Date of Patent: Jan. 5, 2021

(54) SEARCH-INITIATED CONTENT UPDATES

(71) Applicant: Microsoft Technology Licensing, LLC, Redmond, WA (US)

(72) Inventors: Rahul Gupta, Saharanpur (IN); Justin V. George, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 15/675,298

(22) Filed: Aug. 11, 2017

(65) Prior Publication Data

US 2019/0050456 A1 Feb. 14, 2019

(51) Int. Cl.
| | |
|---|---|
| *G06F 16/2457* | (2019.01) |
| *G06F 16/9535* | (2019.01) |
| *G06F 16/951* | (2019.01) |
| *H04N 21/84* | (2011.01) |

(52) U.S. Cl.
CPC .. *G06F 16/24575* (2019.01); *G06F 16/24578* (2019.01); *G06F 16/951* (2019.01); *G06F 16/9535* (2019.01); *H04N 21/84* (2013.01)

(58) Field of Classification Search
CPC .............................................. G06F 16/24575
See application file for complete search history.

(56) References Cited

U.S. PATENT DOCUMENTS

| | | | |
|---|---|---|---|
| 6,633,867 | B1 | 10/2003 | Kraft et al. |
| 6,751,611 | B2 | 6/2004 | Krupin et al. |
| 8,645,358 | B2 | 2/2014 | Wu et al. |
| 8,868,548 | B2 | 10/2014 | Kurzion |
| 9,158,836 | B2 | 10/2015 | Chitiveli et al. |
| 9,418,104 | B1 | 8/2016 | Kim et al. |

(Continued)

FOREIGN PATENT DOCUMENTS

WO 2011069131 A1 6/2011

OTHER PUBLICATIONS

Whitenton, Kathryn, "Mobile Faceted Search with a Tray: New and Improved Design Pattern", https://www.nngroup.com/articles/mobile-faceted-search/, Published on: Jul. 26, 2015, 5 pages.

(Continued)

*Primary Examiner* — Van H Oberly
(74) *Attorney, Agent, or Firm* — Medley, Behrens & Lewis, LLC

(57) ABSTRACT

Systems and methods are disclosed for search-initiated content updates. In one implementation, a search query is received from a user. The search query is processed to determine a content update parameter that reflects a projection of content updates associated with the search query. A content presentation specification that defines an aspect of a presentation of search results associated the search query is generated. The content presentation specification is provided to a content presentation interface that executes on a device associated with the user. A first content update instance is generated based on the content update parameter. Based on the first content update instance, a content update is identified. The identified content update is provided to the content presentation interface that executes on the device for presentation in accordance with the content presentation specification.

20 Claims, 8 Drawing Sheets

(56) References Cited

U.S. PATENT DOCUMENTS

| | | | |
|---|---|---|---|
| 2010/0332513 A1* | 12/2010 | Azar | G06F 16/9574 707/769 |
| 2011/0154183 A1* | 6/2011 | Burns | G06F 16/957 715/234 |
| 2011/0202874 A1* | 8/2011 | Ramer | G06F 16/2428 715/810 |
| 2013/0246926 A1 | 9/2013 | Vemireddy | |
| 2019/0259386 A1* | 8/2019 | Kudurshian | G06F 16/685 |

OTHER PUBLICATIONS

"Custom Search Element Control API", https://developers.google.com/custon-search/docs/element, Published on: Oct. 13, 2012, 16 pages.

"Advanced member search layouts", https://help.wildapricot.com/display/DOC/Advanced+member+search+layouts, Published on: Nov. 1, 2014, 5 pages.

"International Search Report and Written Opinion Issued in PCT Application No. PCT/US2018/038645", dated Aug. 21, 2018, 13 Pages.

\* cited by examiner

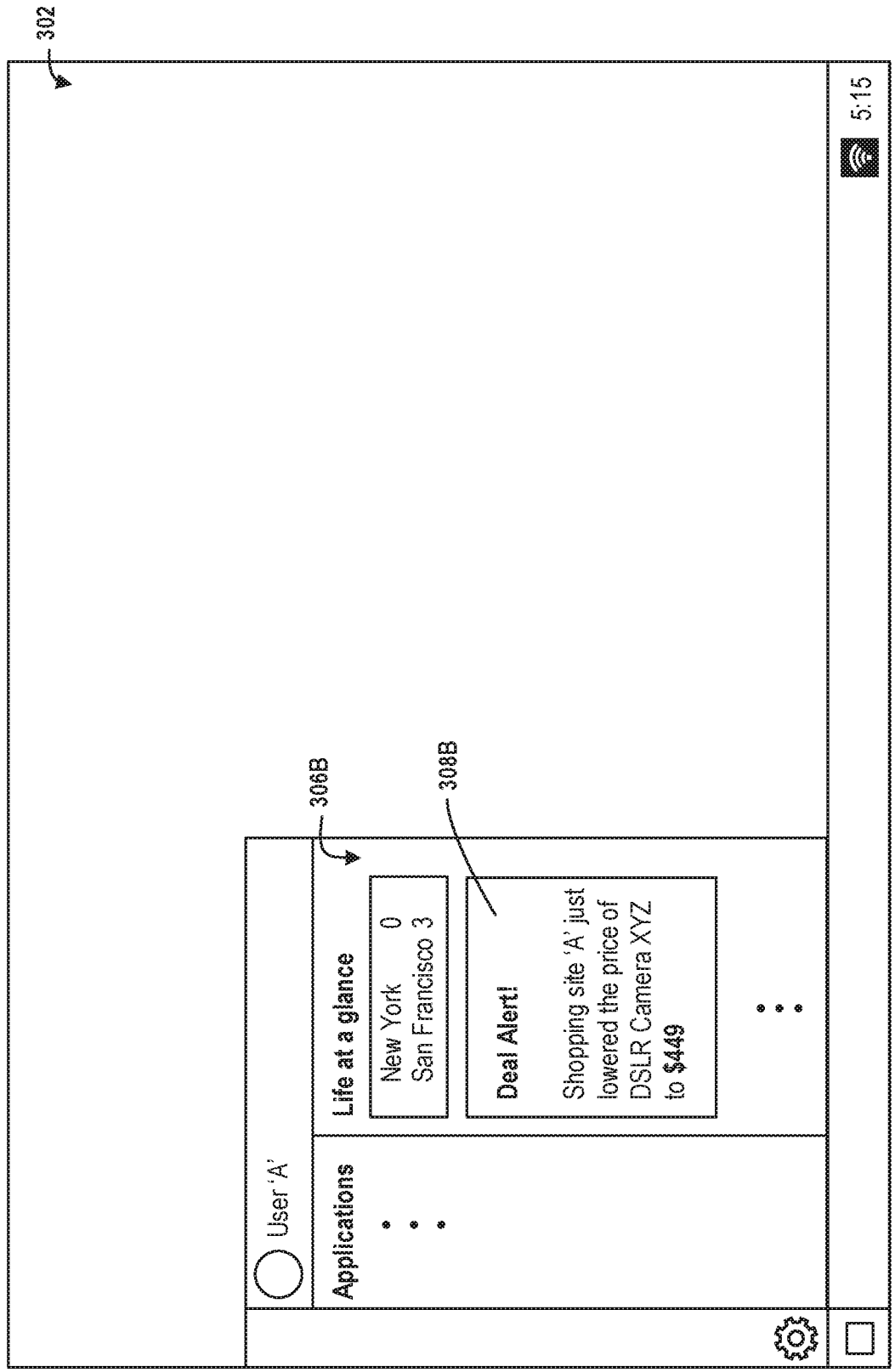

SEARCH-INITIATED CONTENT UPDATES

TECHNICAL FIELD

Aspects and implementations of the present disclosure relate to data processing and, more specifically, but without limitation, to search-initiated content updates.

BACKGROUND

Search engines enable retrieval of information in response to search queries. Some search engines can retrieve information from multiple data sources.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for search-initiated content updates. In one implementation, a search query is received from a user. The search query is processed to determine a content update parameter that reflects a projection of content updates associated with the search query. A content presentation specification that defines an aspect of a presentation of search results associated the search query is generated. The content presentation specification is provided to a content presentation interface that executes on a device associated with the user. A first content update instance is generated based on the content update parameter. Based on the first content update instance, a content update is identified. The identified content update is provided to the content presentation interface that executes on the device for presentation in accordance with the content presentation specification.

In another aspect of the present disclosure, a first search query is received from a user. The first search query is provided to a search service. In response to the first search query, a content presentation specification associated with the search query is received. A content update with respect to the first search query is received. The content update, as formatted via the content presentation specification, is presented within a content presentation interface that executes at a device associated with the user.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 3A-3B illustrate example scenarios described herein, according to example embodiments.

DETAILED DESCRIPTION

Figure 1:
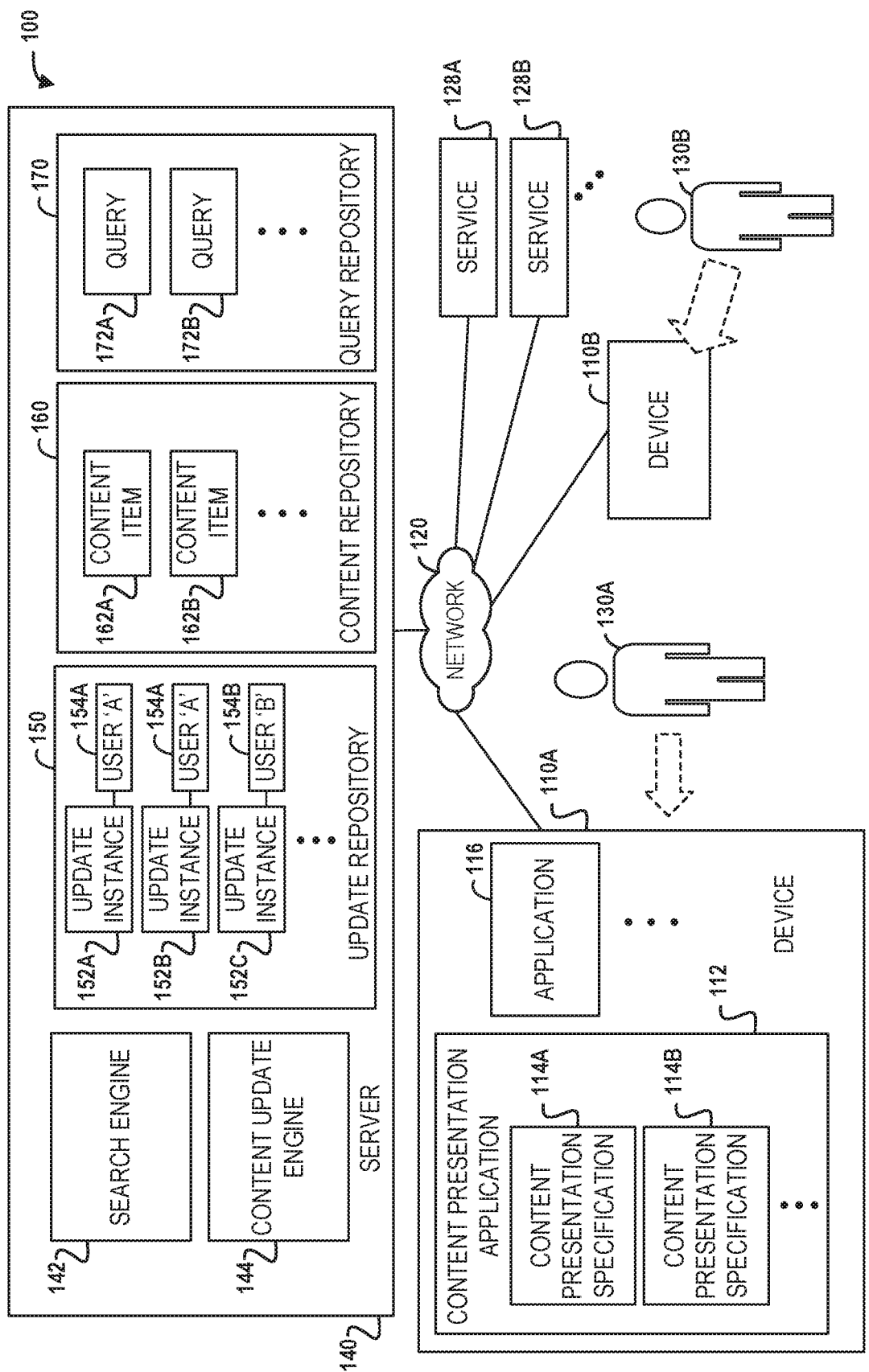
FIG. 1 illustrates an example system, in accordance with an example embodiment.

Aspects and implementations of the present disclosure are directed to search-initiated content updates.

It can be appreciated that various search technologies such as search engines are utilized by users wishing to obtain information on a particular topic. In certain scenarios, such information may pertain to an event or occurrence with respect to which content (e.g., news, updates, etc.) may change frequently. For example, users may wish to obtain information regularly regarding an ongoing sports tournament or other such public event. However, using existing search technologies, such users may need to return to a search interface (e.g., a search engine webpage) in order to perform another search and view such updated content. Doing so can be tedious and inconvenient to users, particularly in scenarios in which little or not content has changed. Additionally, the user may not learn of changes that have occurred (which may be of particular interest to the user) until performing an updated search. Moreover, while it may be possible for the user to obtain a dedicated application (e.g., a mobile 'app') associated with a particular topic, doing so may be tedious, e.g., in scenarios in which the user may only be interested in content updates for a relatively short period of time (e.g., a few days).

Accordingly, described herein in various implementations are technologies, including methods, machine readable mediums, and systems, that enable search-initiated content updates. The described technologies utilize search queries provided by a user to trigger or initiate various content updates. For example, a received search query can be processed or analyzed to predict whether related future content updates (e.g., updates pertaining to entitie(s) mentioned/associated with the query) are likely to be received and/or whether such updates are likely to be of interest to the user that submitted the query. Additionally, a content presentation specification can be generated based on/with respect to the search query/search results. Such a specification can define various characteristics (e.g., visual characteristics, interactive functionality, etc.) reflected in a presentation of search results associated the search query (e.g., the search results as presented within a webpage). The generated content presentation specification can then be utilized by a content presentation interface (e.g., a dedicated application, section of a navigation panel, notification, etc.) to present subsequently received updates in accordance with characteristics defined in the content presentation specification(s). Such characteristics can reflect, for example, the structure, location, formatting, appearance, and/or other aspects with respect to which content updates are to be presented.

Upon determining that future content updates are likely, content update instance(s) can be generated (as described herein) to notify or otherwise provide such content updates to the user. In doing so, the user can receive content updates pertaining to a search query without needing to perform additional search queries. Additionally, as noted above, such content updates can be presented in accordance with the generated content presentation specification. In doing so, such updates can be provided to a device/user and presented within various interfaces/contexts (e.g., within a dedicated application, section of a navigation panel, etc.) in accordance with characteristics (structure, formatting, interactive functionality) defined in the content presentation specification. Accordingly, content updates determined to be likely to be relevant to a user can be identified and provided to a user (e.g., without the user returning to a search webpage/interface and initiating another search). Additionally, by utilizing the described content presentation specification(s), such updates can be provided/presented within various contexts/interfaces (dedicated application, navigation panel, etc.) while maintaining various characteristics of the originally presented search results/content (e.g., as presented within a search webpage).

Moreover, an expiration of the content update instance can be determined and associated with the instance. Such an expiration can reflect a chronological interval (date, time, etc.) at which such content updates may no longer be relevant or of interest to the user. The content update instance can thus be disabled or deactivated when the referenced expiration occurs. In doing so, subsequent content updates associated with the referenced query may not be provided/presented in the manner described herein. Such functionality can be advantageous, for example, in scenarios in which a user is interested in ongoing content updates for a defined period of time (e.g., while a sporting event is ongoing), but is not likely to be interested in such updates after the event has concluded.

It can therefore be appreciated that the described technologies are directed to and address specific technical challenges and longstanding deficiencies in multiple technical areas, including but not limited to content retrieval, search engines, and user interfaces. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes device 110A and device 110B (collectively, devices 110). Each of the referenced devices 110 can be, for example, a laptop computer, a desktop computer, a terminal, a mobile phone, a tablet computer, a smart watch, a personal digital assistant (PDA), a digital music player, a server, a wearable device, a virtual reality device, an augmented reality device, a holographic device, and the like. User 130A and user 130B (collectively, users 130) can be human users who interact with devices such as device 110A and device 110B, respectively. For example, user 130A can provide various inputs (e.g., via an input device/interface such as a keyboard, mouse, touchscreen, microphone—e.g., for voice/audio inputs, etc.) to device 110A. Device 110A can also display, project, and/or otherwise provide content to user 130A (e.g., via output components such as a screen, speaker, etc.).

As shown in FIG. 1, device 110 can include content presentation application 112. Content presentation application 112 can be an application or module that configures/enables device 110A to perform various operations such as are described herein. For example, content presentation application 112 can configure or enable device 110A to present content, such as content updates to the user. In certain implementations, such content updates can be updates that reflect or include content that relates to a search query previously submitted by the user (e.g., to a search engine), as described herein.

In certain implementations, such content updates can be presented by content presentation application 112 in conjunction with various elements such as content presentation specification 114A and content presentation specification 114B (collectively, content presentation specifications 114). Such content presentation specifications can be, for example, various parameters, settings, etc., that define the structure, location, formatting, appearance, and/or other visual characteristics with respect to which content updates are to be presented at device 110A. For example, content presentation specification 114A can dictate the manner in which certain content updates (e.g., those pertaining to a certain search query) are to be presented within a content presentation interface of the device. Such a content presentation interface can be, for example, a dedicated application or portion of an interface element (e.g., a tile or section of a navigation panel provided by the operating system of the device). Accordingly, received content updates can be presented within various content presentation interfaces (dedicated application, tile within a navigation panel, etc.) in accordance with the visual characteristics defined in the content presentation specification associated with such an update. By way of illustration, content presentation specification 114A can define visual characteristics with respect to which updates pertaining to one search query (e.g., changes to the score of a sports game) are to be presented, while content presentation specification 114B can define visual characteristics with respect to which updates pertaining to another search query (e.g., changes to the price of an item for sale) are to be presented.

Figure 2A:
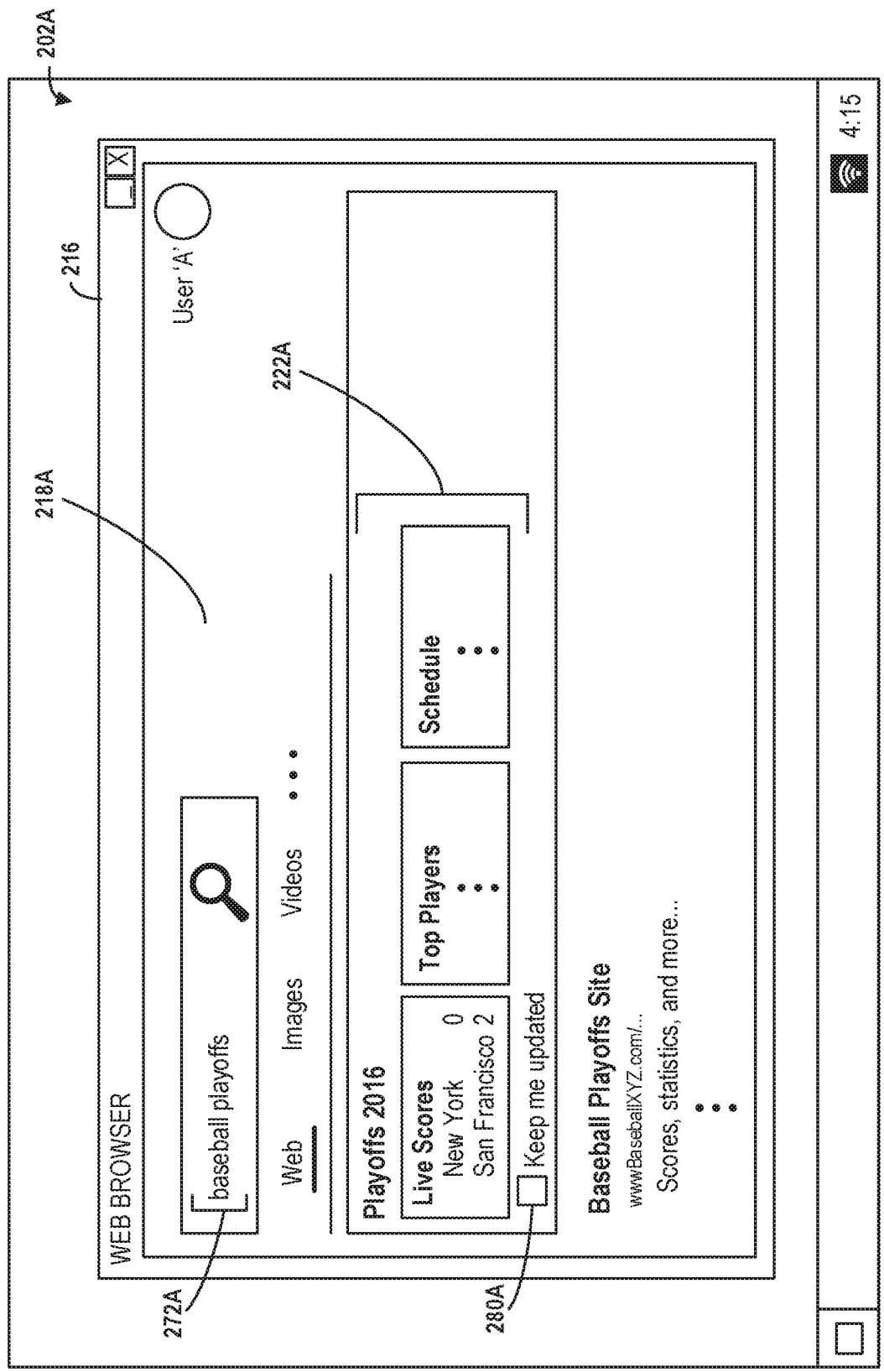
FIGS. 2A-2B illustrate example scenarios described herein, according to example embodiments.

As noted above, device(s) 110 provide various interfaces to user(s) 130, such as a user interface (e.g., a graphical user interface (GUI). Such interface(s) can be presented via display device(s) such as a light emitting diode (LED) display, a liquid crystal display (LCD) display, a touchscreen display, and/or any other such device capable of displaying, depicting, or otherwise presenting user interface(s). Such user interfaces can be graphical depiction(s) of an operating system and/or various applications executing on device 110. FIG. 2A depicts an example user interface 202A presented via device 110A.

It should be noted that while the interface(s) depicted in FIG. 2A (as well as various other examples and illustrations provided herein) are those that can be presented on a laptop or desktop computing device, this is simply for the sake of clarity and brevity. Accordingly, in other implementations device(s) 110 can be various other types of devices, including but not limited to various portable and/or wearable devices. In such scenarios, the described technologies can operate in the manner described herein within the context of the user interface of the particular device (smartphone, tablet device, etc.).

Figure 6:
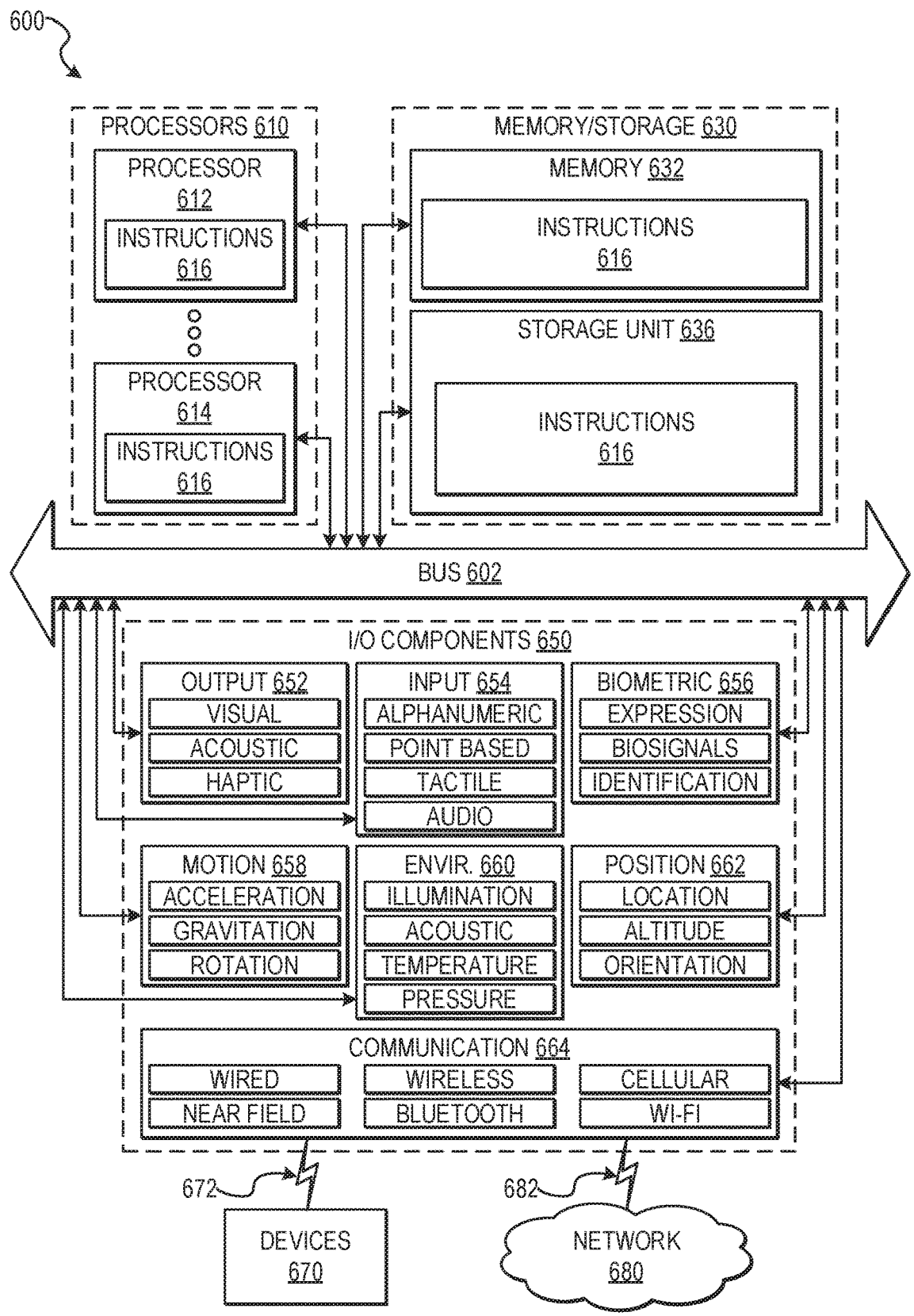
FIG. 6 is a block diagram illustrating components of a machine able to read instructions from a machine-readable medium and perform any of the methodologies discussed herein, according to an example embodiment.

As shown in FIG. 1, device(s) 110 can also include various applications, programs, modules, etc., such as application 116. The referenced application(s) can be stored in memory of device 110 (e.g. memory 630 as depicted in FIG. 6 and described below). One or more processor(s) of device 110 (e.g., processors 610 as depicted in FIG. 6 and described below) can execute such application(s). In doing so, device 110 can be configured to perform various operations, present content to user(s) 130, etc. Examples of such applications include but are not limited to: web browsers, productivity applications (e.g., word processors, spreadsheet applications, etc.), social media/messaging applications, etc.

It should also be noted that while various components (e.g., content presentation application 112, application 116, etc.) are depicted (e.g., in FIG. 1) as operating on a device 110, this is only for the sake of clarity. However, in other implementations the referenced components (e.g., content presentation application 112) can also be implemented on other devices/machines. For example, in lieu of (and/or in addition to) executing locally at device 110A, content presentation application 112 can be implemented remotely (e.g., on a server device such as server 140, or within a cloud service or framework).

As also shown in FIG. 1, device(s) 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a "cloud" service), etc., and can include search engine 142, content update engine 144, update repository 150, content repository 160, and query repository 170.

Search engine 142 can be an application or module configured to search and/or retrieve content (e.g., documents, files, information, etc.) stored on server 140 and/or at other locations (e.g., on remote servers, devices, etc.). In certain implementations, such content can be stored within content repository 160. In certain implementations, search engine 142 can receive search queries (e.g., from devices 110), perform the referenced search operation(s), and provide content (e.g., search results, etc.) back to devices 110.

Content repository 160 can be a storage resource such as an object-oriented database, a relational database, etc. within which content item 162A and content item 162B (collectively content items 162) can be stored (e.g., on server 140). Such content items 162 can include but are not limited to documents, files, data, content, media, etc. It should be understood that, in various implementations, search engine 142 and/or content repository 160 can also be employed on other machines/devices (e.g., in scenarios in which server 140 utilizes remote or "cloud"-based storage to store documents, files, etc.).

Figure 2B:
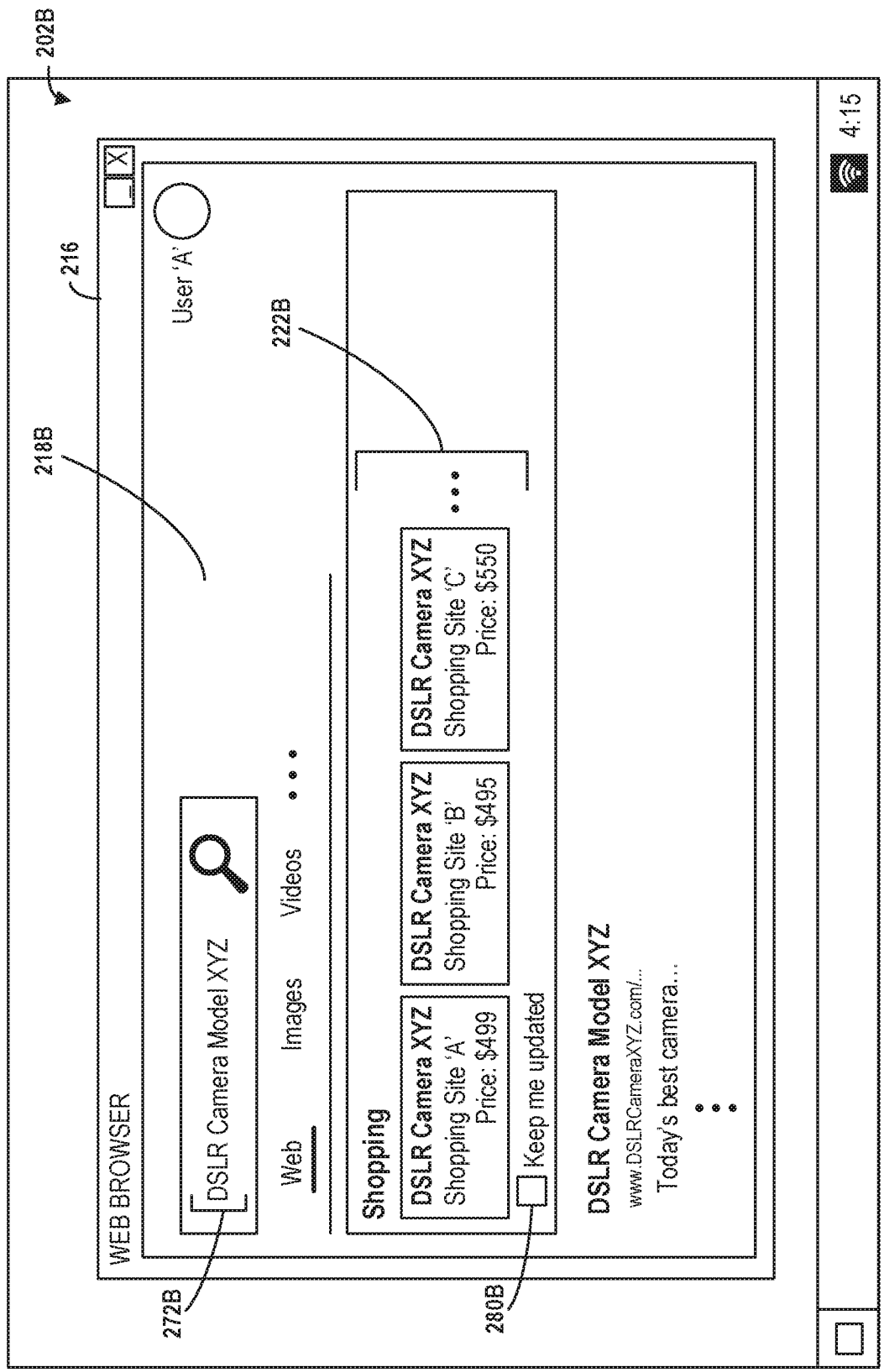

Content update engine 144 can be an application or module configured to process search queries and initiate content updates based on such queries. For example, as shown in FIG. 2A, a user (e.g., user 130A) can provide or submit a search query (query 272A—"baseball playoffs") within application 216 (here, a web browser executing on device 110A). Such a query can be transmitted to/received by server 140 and processed by search engine 142 (e.g., to identify content such as search results, web pages, etc., relevant to the received query). By way of further illustration, FIG. 2B depicts another scenario in which a user provides or submits query 272B ("DSLR Camera . . . ") within application 216. Such a query can be transmitted to/received by server 140 and processed by search engine 142 (e.g., to identify content such as product listings, search results, web pages, etc., relevant to the received query).

The referenced query (e.g., query 272A as shown in FIG. 2A) can be processed by content update engine 144 to determine content update parameter(s) associated with the query. Such content update parameter(s) can reflect various projections or other aspects of the manner in which content pertaining to the received query is likely to change, update, etc. One example content update parameter can reflect the frequency with which user 130A (and/or other users) submit the same or comparable/related queries to the search engine (e.g., within a chronological interval such as over several days, weeks, etc.). Another example content update parameter can reflect a degree to which content pertaining to the received query changes (e.g., above a defined threshold). One such example content update parameter can reflect that content updates are to be provided in scenarios in which the price of an item for sale decreases by a defined percentage, amount, etc. (e.g., price decreases by 10% or more since the initial search was performed.

By way of illustration, in the scenario depicted in FIG. 2A, content update engine 144 can determine that user 130A (here, the user from which the query was received) and/or other users submitted multiple comparable/related queries (e.g., "baseball playoffs," "baseball playoff scores," etc.) over the past week. Such a determination can be computed, for example, based on queries stored in query repository 170 (as described below). It should be understood that an increase in the frequency of such queries (e.g., a user submitting the same/similar query multiple times within a time period) can reflect that content associated with such a query may be changing/updating frequently.

By way of further illustration, in the scenario depicted in FIG. 2B, content update engine 144 can identify pricing information within the search results (e.g., "$499," "$450," etc., as shown) and can further determine (e.g., based on comparison with subsequent pricing information) when such price(s) (e.g., the lowest displayed price) decreases by more than a defined threshold (e.g., 10%). It should be understood that a change or decrease in such content (here, price) above the referenced threshold can reflect a change associated with such a query ("DSLR Camera . . . ") that may be of particular interest/relevance to the user that provided the query.

Query repository 170 can be a storage resource such as an object-oriented database, a relational database, etc. within which query 172A and query 172B (collectively queries 172) can be stored (e.g., on server 140). Such queries 172 can include search queries received from various users, devices, etc., as well as corresponding metadata, information, etc. (reflecting, for example, the time/date the query was received, the user that initiated the query, etc.). It should be understood that, in various implementations, query repository 170 can also be employed on other machines/devices (e.g., in scenarios in which server 140 utilizes remote or "cloud"-based storage to store queries, etc.).

Having identified/determined the referenced content update parameter(s), content update engine 144 can generate a content update instance. Such a content update instance can be a record, entry, etc., that reflects a projected or expected content update, e.g., with respect to the search query with respect to which it was generated. For example, a content update instance generated with respect to query 272A as shown in FIG. 2A ("baseball playoffs") can reflect a projected content update(s) through the duration of the baseball playoffs (e.g., for the next two weeks). By way of further example, a content update instance generated with respect to query 272B as shown in FIG. 2B ("DSLR Camera . . . ") can reflect projected content update(s) (e.g., price changes) above a defined threshold (e.g., 10% of the price previously retrieved/presented to the user). It should be understood that such content update instance(s) are provided by way of example and that other update instances are also contemplated.

The generated content update instances can be stored in update repository 150. Update repository 150 can be a storage resource such as an object-oriented database, a relational database, etc. within which update instances 152 (e.g., update instance 152A, update instance 152B, etc.) can be stored (e.g., on server 140). As noted above, such content instances 152 can reflect various predictions/projections with respect to future content updates associated with a received search query. It should be understood that, in various implementations, update repository 150 can also be employed on other machines/devices (e.g., in scenarios in which server 140 utilizes remote or "cloud"-based storage to store documents, files, etc.).

Additionally, in certain implementations various information, metadata, etc. can be stored or otherwise associated with the referenced update instance(s) 152. For example, as shown in FIG. 1, metadata 154A and metadata 154B (collectively, metadata 154) can be associated with various update instances. Such metadata can reflect, for example, the user with respect to which a particular update instance is associated with. For example, update instances 152A and 152B are associated with user 'A,' while update instance 152C is associated with user 'B.'

Using the referenced update instances 152, content update engine 144 can identify content updates. Such content updates can reflect subsequent content items 162 (e.g., as stored in content repository 160 or received from services 128, as described below) that correspond to or are otherwise associated with the content update instance. For example, such a content update can reflect a new content item that reflects a change, update associated with the search query received from the user. By way of illustration, in the scenario depicted in FIG. 2A, a change in the score of a game during the baseball playoff series (e.g., since the search query was provided by the user) can reflect a content update associated with query 272A ("baseball playoffs"). By way of further illustration, in the scenario depicted in FIG. 2B, a change in the price of a product (e.g., above a defined threshold such as 10% less than the price as presented to the user in response to the initial search query) can reflect a content update associated with query 272B ("DSLR Camera . . . ").

As noted above, in various implementations, the described technologies may control, instruct, or otherwise communicate with various services such as service 128A and service 128B (collectively services 128), as shown in FIG. 1. Such services can be, for example, third-party services that can provide information and/or various functionality, e.g., to user 130 (e.g., information services, social media services, etc.) that may enhance or otherwise be relevant to certain operations described herein. In certain implementations, such services can provide information such as sports scores, financial market updates, news, social media services, etc.

Having identified the referenced content update(s), such updates can be provided to/received by various user(s), device(s), etc. Such updates can be provided to/presented within content presentation interface(s) of the device. Such content presentation interface(s) can be, for example, a dedicated application or portion of an interface element such as a section of a navigation panel, notification, etc. In certain implementations, the provided/received content updates can be presented within the referenced content presentation interfaces in accordance with characteristics defined in content presentation specification(s) associated with such an update. Such characteristics can reflect, for example, the structure, location, formatting, appearance, and/or other aspects with respect to which content updates are to be presented.

Figure 3A:
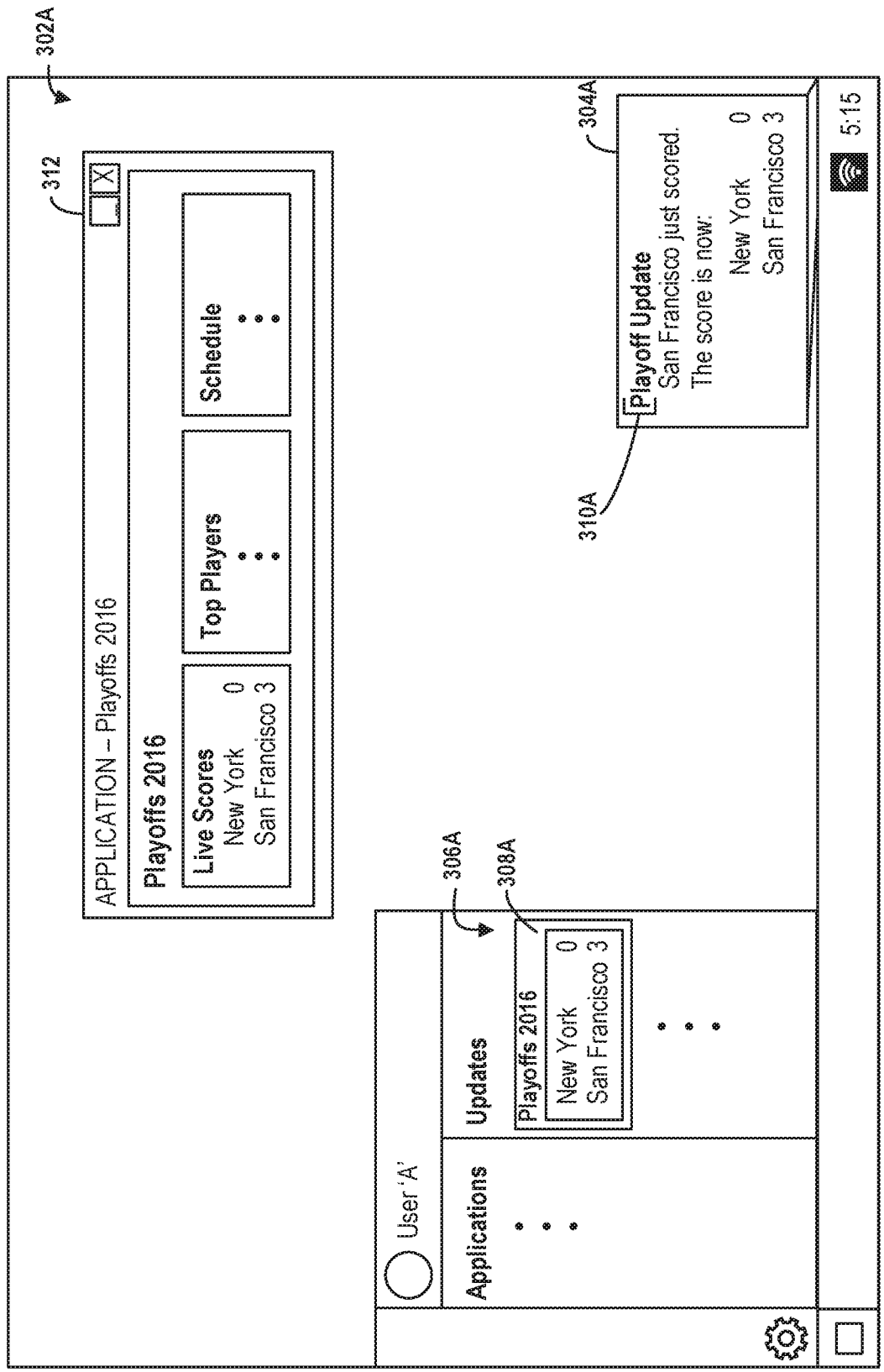

By way of illustration, FIG. 3A depicts an example scenario reflecting various content presentation interfaces executing on device 110A within which the described content update(s) can be provided or otherwise directed. As shown in FIG. 3A, in certain implementations the received content update(s) can be provided to device 110A for presentation as notification 304A. Such a notification 304A can utilize a content presentation specification (e.g., content presentation specification 114A as shown in FIG. 1) to define the formatting, appearance, etc. of the notification 304A. For example, the referenced content presentation specification can define that notification 304A (as well as other notifications provided based on/with respect to query 272A as shown in FIG. 2A) is to include the header 310A ("Playoff Update"), as shown in FIG. 3A.

As also shown in FIG. 3A, in certain implementations the referenced content update can be presented/provided within a portion/region of an element of interface 302 such as a region 306A of a navigation panel of an operating system (OS) executing on device 110A. For example, as shown in FIG. 3A, a region/tile 308A of such a region 306A can be utilized to present content updates associated with a particular search query. In certain implementations, such a region/tile 308A can utilize content presentation specification 114A to define the formatting, appearance, etc. in which the update is to be presented. For example, the referenced content presentation specification can define that region/tile 308A is to include the header "Playoffs 2016," as shown in FIG. 3A.

By way of further illustration, FIG. 3B depicts another example scenario in which a content update associated with the search query 272B ("DSLR Camera . . . ") as shown in FIG. 2B is received. As shown in FIG. 3B, such a content update (here, a change in price above a defined threshold, e.g., a decrease by 10%), can be presented/provided within a portion/region of an element of interface 302 such as a region 306B of a navigation panel of an operating system (OS) executing on device 110A. For example, as shown in FIG. 3B, a region/tile 308B of such a region 306B can be utilized to present content updates associated with the referenced search query 272B. In certain implementations, such a region/tile 308B can utilize content presentation specification 114B to define the formatting, appearance, etc. in which the update is to be presented. For example, the referenced content presentation specification can define that region/tile 308B is to include the header "Deal Alert!" as shown in FIG. 3B.

In yet other implementations, the referenced content update can be presented/provided within a content presentation interface such as application 312 as shown in FIG. 3A. Application 312 can be an application generated/provided by content presentation application 112 (as shown in FIG. 1). Such an application 312 (here, a 'Playoffs 2016' application) can provide/present content updates pertaining to the referenced search query 272A ("baseball playoffs," as shown in FIG. 2A) in a standalone application/interface. In certain implementations, such an application 312 can utilize content presentation specification 114A to define the formatting, appearance, etc. of the application (in which the update is to be presented). For example, the referenced content presentation specification can define the structure of various elements within the application (e.g., sections such as 'Live Scores,' 'Top players,' etc.) as shown in FIG. 3A. Accordingly, in certain implementations a received content update provided to dedicated application 312 can be presented within the application 312 in accordance with content presentation specification 114A that defines the formatting, appearance, etc. in which the update (e.g., the change to the score of a baseball game) is to be formatted/presented.

As noted above, in certain implementations, content presentation specification(s) (e.g., content presentation specification 114A as shown in FIG. 1) can define or dictate various parameters, settings, etc., that define the structure, location, formatting, appearance, and/or other visual characteristics with respect to which content updates are to be presented at device 110A. For example, content presentation specification 114A can dictate the manner in which certain content updates (e.g., those pertaining to a search query 272A) are to be presented within a content presentation interface of the device. Such a content presentation interface can be, for example, a dedicated application or portion of an interface element (e.g., a tile or section of a navigation panel provided by the operating system of the device). Accordingly, received content updates can be presented within various content presentation interfaces (dedicated application, tile within a navigation panel, etc.) in accordance with the visual characteristics defined in the content presentation specification associated with such an update. By way of illustration, content presentation specification 114A can define visual characteristics with respect to which updates pertaining to one search query (e.g., changes to the score of a sports game) are to be presented, while content presentation specification 114B can define visual characteristics with respect to which updates pertaining to another search query (e.g., changes to the price of an item for sale) are to be presented.

Additionally, in certain implementations the described technologies can be configured to organize, group, or otherwise collect various content updates, such as those determined to be related to/associated with one another. For example, in a scenario in which the described technologies identify multiple content updates with respect to a certain user (e.g., sports-related updates, such as those associated with a certain baseball team, football team, basketball team, etc.), such updates can be grouped or organized together (e.g., within a single interface). For example, the referenced updates can be collected/organized within a single application (e.g., for 'sports' updates). In doing so, such updates can be presented to the user within a single interface.

Additionally, in certain implementations the referenced content update(s) can be provided to/presented within other application(s) (e.g., a third-party application such as application 116 as shown in FIG. 1). In certain implementations, such content update(s) can be provided to other service(s) (e.g., a third-party service such as service 128A as shown in FIG. 1). In doing so, such updates can be utilized to enhance the operation of numerous applications, services, etc.

It should be understood that the described technologies can be configured to enable users 130 to 'opt-in,' 'opt-out,' and/or otherwise configure various parameters, settings, etc., with respect to the described functionality. For example, the user may configure what types of content, activity, etc. should or should not be stored. Additionally, the described technologies utilize data encryption, identity verification, and/or related technologies to ensure that the referenced content cannot be accessed/retrieved by unauthorized parties. In doing so, the described technologies enable the described benefits and technical improvements to be realized while maintaining the security and privacy of the user's data.

While many of the examples described herein are illustrated with respect to single server 140 and/or individual devices 110, this is simply for the sake of clarity and brevity. However, it should be understood that the described technologies can also be implemented (in any number of configurations) across multiple devices and/or other machines/services.

Further aspects and features of devices 110 and server 140 are described in more detail below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 4:
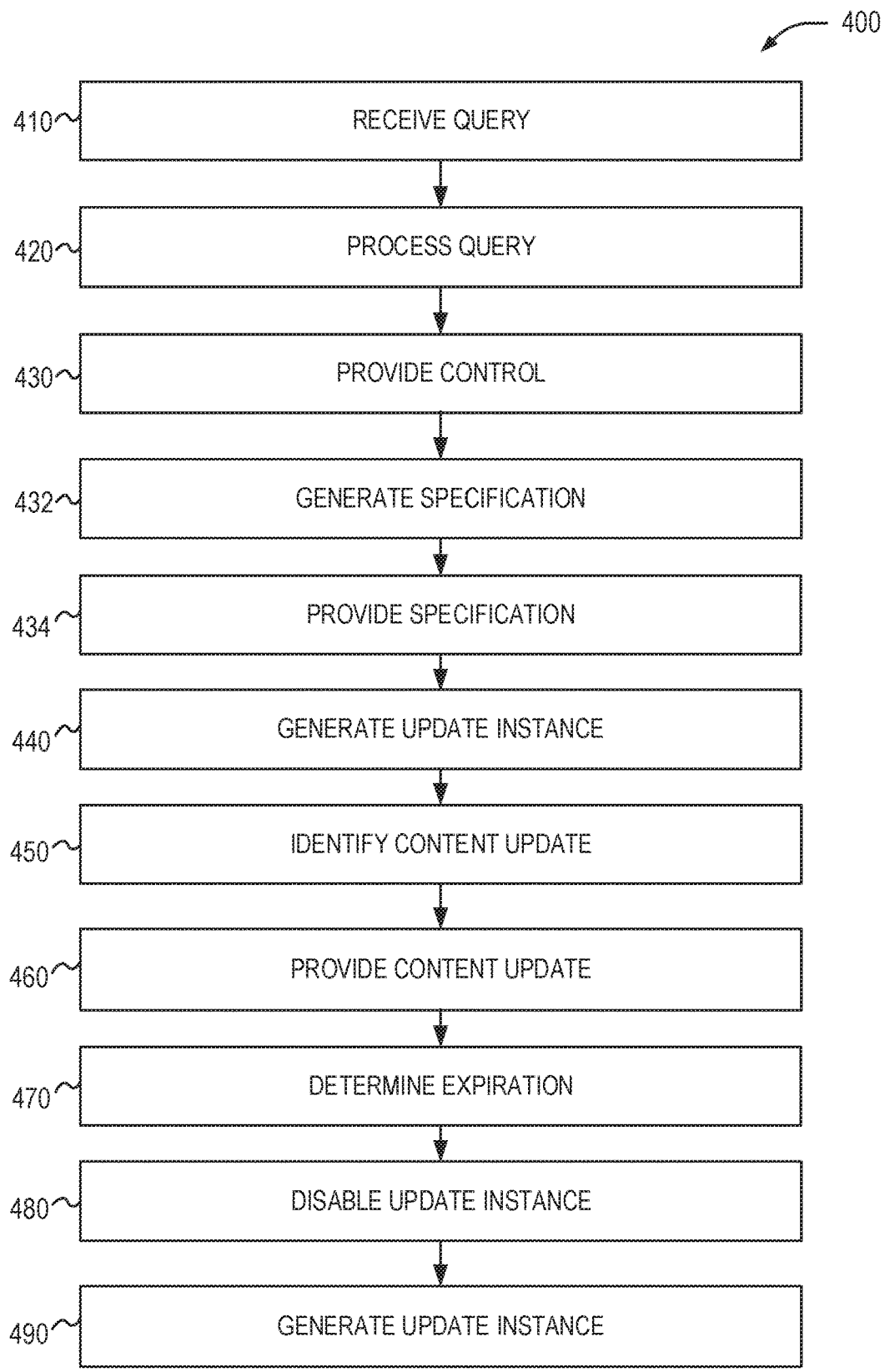
FIG. 4 is a flow chart illustrating a method, in accordance with an example embodiment, for search-initiated content updates.

FIG. 4 is a flow chart illustrating a method 400, according to an example embodiment, for search-initiated content updates. The method is performed by processing logic that can comprise hardware (circuitry, dedicated logic, etc.), software (such as is run on a computing device such as those described herein), or a combination of both. In one implementation, the method 400 is performed by one or more elements depicted and/or described in relation to FIG. 1 (including but not limited to server 140, search engine 142, and/or content update engine 144), while in some other implementations, the one or more blocks of FIG. 4 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 410, a search query is received. Such a search query can be received from a device and/or user. For example, as shown in FIG. 2A and described herein, a user can provide search query 272A ("baseball playoffs") within a search interface. Such a query can be provided to/received by a search engine (e.g., search engine 142 of server 140). By way of further example, as shown in FIG. 2B and described herein, a user can provide search query 272B ("DSLR Camera . . . ") within a search interface. Such a query can be provided to/received by a search engine (e.g., search engine 142 of server 140). Such queries can include but are not limited to one or more alphanumeric characters, words, strings, and/or other content elements.

In certain implementations, various aspects of operation 410 (as well as the other operations described with respect to FIG. 4) are performed by server 140, search engine 142, and/or content update engine 144 (e.g., as depicted in FIG. 1). In other implementations, such aspects can be performed by one or more other elements/components, such as those described herein.

At operation 420, the search query (e.g., the query received at operation 410) is processed. In doing so, various entitie(s) (e.g., a topic, idea, item, etc.) can be identified with respect to the search query. Additionally, in certain implementations, a content update parameter can be identified, such as a content update parameter associated with the search query. Such content update parameter(s) can reflect various aspects of the manner in which content pertaining to the received query is likely to change, update, etc.

For example, in certain implementations, the referenced search query can be compared with other search querie(s) (e.g., those stored in query repository 170). In doing so, the frequency with which the user that submitted the query (and/or other users) submits the same or comparable/related queries to the search engine can be determined. By way of illustration, in the scenario depicted in FIG. 2A, content update engine 144 can determine that user 130A (here, the user from which the query was received) and/or other users submitted multiple comparable/related queries (e.g., "baseball playoffs," "baseball playoff scores." etc.) over the past week. Such a determination can be computed, for example, based on queries 172 stored in query repository 170. By way of illustration, an increase in the frequency of such queries (e.g., a user submitting the same/similar query multiple times within a time period) can reflect that content associated with such a query may be changing/updating frequently.

By way of further illustration, in the scenario depicted in FIG. 2B, content update engine 144 can identify pricing information within the search results (e.g., "$499," "$450," etc., as shown) and can further determine (e.g., based on comparison with subsequent pricing information) when such price(s) (e.g., the lowest displayed price) decreases by more than a defined threshold (e.g., 10%). It should be understood that a change or decrease in such content (here, price) above the referenced threshold can reflect a change associated with such a query ("DSLR Camera . . . ") that may be of particular interest/relevance to the user that provided the query.

Another example content update parameter can reflect a degree to which content pertaining to the received query changes (e.g., above a defined threshold). One such example content update parameter can reflect that content updates are to be provided in scenarios in which the price of an item for sale decreases by a defined percentage, amount, etc. (e.g., price decreases by 10% or more since the initial search was performed.

It should be noted that, in certain implementations, the described technologies can be utilized in scenarios beyond those involving search engines/queries. For example, various user interactions (e.g., the selection of links, cards, or other such interface elements that correspond to or are otherwise associated with content, keywords, etc., pertaining to a particular topic) can be utilized to determine that certain content updates may be of interest/relevance to such a user. By way of illustration, in a scenario in which a user selects or otherwise interacts with multiple items (e.g., links presented within a social media 'feed') that pertain to a particular topic (e.g., baseball playoffs), such activity can indicate interest/relevance of corresponding content updates to the user. Accordingly, such interactions can be used to initiate/activate the described content updates, as described herein. It should be understood that the described actions, interactions, etc. are provided by way of example and that other actions, etc. can also be used.

At operation 430, a content update control (and/or a corresponding instruction to present such a control) is provided (e.g., to the user or device). Such a content update control can be a selectable element or other such interactive element (e.g., a button, check box, etc.) that can be provided/presented to a device/user. The user can select or otherwise activate such a control in order to indicate their approval of a corresponding option. By way of illustration, FIG. 2A depicts an example content update control 280A ('Keep me updated') presented to user 130A via device 110A. As shown, such a control can enable the user to indicate interest in receiving content updates associated with the submitted query (here, query 272A—"baseball playoffs"). Accordingly, upon identifying (e.g., at operation 420) a content update parameter that reflects that content associated with a query may be changing/updating frequently, a content update control (and/or an instruction to present such a control) can be provided/presented to the user/device associated with the query. In doing so, the user can select the referenced control, e.g., in order to activate various content updates (as described herein).

In other implementations, the referenced determination (e.g., with respect to an interest/relevance of content updates) can be computed in other ways. For example, in lieu of a selection of a control (e.g., control 280A as shown in FIG. 2A or control 280B as shown in FIG. 2B), various actions, interactions, etc. such as those initiated by the user can be accounted for in determining a degree of relevance/interest certain content updates may have to the user. By way of illustration, in a scenario in which a user initiates multiple searches (e.g., five searches) within a defined period of time (e.g., within a two-hour timespan), and such searches can be identified as pertaining to the same/similar topics, content etc. (e.g., baseball playoffs), it can be determined that the referenced content updates are also likely to be relevant/of interest to the user. Accordingly, in certain implementations, even in a scenario in which the user may not have selected the referenced control 280B, the described content updates can be activated and provided to the user, as described herein. It should be understood that the described scenario(s) are provided by way of example and that other actions, interactions, etc., can also be used to determine the relevance of content updates to a user.

At operation 432, a content presentation specification is generated. Such a content presentation specification can be a file, object, set of instructions/parameters, etc. that defines the structure, location, formatting, appearance, and/or other characteristics with respect to which content updates are to be presented (e.g., at device 110A). In certain implementations, such a content presentation specification can be generated in response to a selection of a content update control (e.g., as provided at operation 430).

In certain implementations, the referenced content presentation specification can be generated based on various content elements such as those that make up a web page or other such interface within which the search query and/or search results are provided. For example, FIG. 2A depicts webpage 218A as presented within browser 216. As shown in FIG. 2A, webpage 218A (within which search query 272A is provided by the user) presents and/or otherwise incorporates various content elements in order to present search results (and related content) in response to the query. For example, webpage 218A includes content element(s) 222A which can reflect or incorporate content such as HTML code, images, dynamic/interactive elements, etc. provided within webpage 218A in response to the submitted search query. Accordingly, such content elements (e.g., content elements 222A) can be utilized to generate the referenced content presentation specification (e.g., content presentation specification 114A as shown in FIG. 1). For example, the HTML code from webpage 218A that corresponds to content elements 222A ('Live Scores,' 'Top players,' etc.) can be utilized to generate a content presentation specification that reflects comparable or related content formatting, arrangements, etc. Such a content presentation specification can thus define or dictate the manner in which subsequent content updates (pertaining to the referenced search query) are to be presented (e.g., within a standalone app, in a section or tile of a navigation panel, etc., as described herein).

By way of further illustration, content presentation specification 114A (as shown in FIG. 1) can dictate the manner in which certain content updates (e.g., those pertaining to search query 272A as shown in FIG. 2A) are to be presented within a content presentation interface of the device. Examples of such a content presentation interface are depicted in FIG. 3A. For example, as shown in FIG. 3A, a dedicated application 312 can utilize content presentation specification 114A to define the formatting, appearance, etc. in which content updates (and other related information) are to be presented. By way of further example, content presentation specification 114A can define the formatting/appearance, etc. of tile 308A (which presents content updates pertaining to the referenced query) within navigation panel 306A. By way of yet further example, content presentation specification 114A can define the formatting/appearance, etc. of notification 304A (which presents content updates pertaining to the referenced query).

In doing so, upon receiving content updates pertaining to a search query (as described below), such updates can be presented within the described content presentation interface(s) (dedicated application, tile within a navigation panel, etc.) in accordance with the visual characteristics defined in the content presentation specification 114 associated with such an update.

At operation 434, the content presentation specification (e.g., as generated at operation 432) is provided, e.g., to a content presentation interface that executes on a device associated with the user (e.g., the user from which the search query was received at operation 410). As noted above, such a content presentation interface can be, for example, a dedicated application (e.g., content presentation application 112, as shown in FIG. 1). By way of further example, in certain implementations such a content presentation interface can be a portion of an interface element such as tile 308A within navigation panel 306A, as depicted in FIG. 3A. Accordingly, the referenced content presentation specification can define or dictate the manner in which subsequent content updates (pertaining to the referenced search query) are to be presented to the user/at the device (e.g., within a standalone app, in a section or tile of a navigation panel, etc., as described herein).

At operation 440, a content update instance is generated (e.g., with respect to the user that submitted the query). In certain implementations, such a content update instance can be generated based on an identification of the content update parameter (e.g., at operation 420). As described herein, a content update instance can be a record, entry, etc., that reflects a projected or expected content update, e.g., with respect to the search query with respect to which it was generated. Accordingly, in certain implementations various predictions or projections of future content update(s) associated with the search query can be computed (e.g., based on previously received queries and/or other information). Additionally, as noted above, in certain implementations the referenced content update instance can be generated based on/in response to a selection of the content update control (e.g., as presented at operation 430) by the user.

By way of illustration, a content update instance generated with respect to query 272A as shown in FIG. 2 ("baseball playoffs") can reflect a projected content update(s) through the duration of the baseball playoffs (e.g., for the next two weeks). Accordingly, such an update instance can reflect various predictions/projections with respect to future content updates associated with a received search query. Additionally, in certain implementations various information, metadata, etc. can be stored or otherwise associated with the referenced update instance(s) 152. Such metadata can reflect, for example, the user with respect to which a particular update instance is associated with.

At operation 450, a content update is identified. Such a content update can be identified, for example, based on the content update instance (e.g., as generated at operation 440). For example, based on the referenced update instance(s) content updates can be identified (e.g., within content repository 160). Such content updates can reflect subsequently generated/received content items that correspond to or are otherwise associated with the content update instance. For example, such a content update can reflect a new content item that reflects a change, update associated with the search query received from the user. By way of illustration, in the scenario depicted in FIG. 2A, a change in the score of a game during the baseball playoff series can reflect a content update associated with query 272A ("baseball playoffs"). By way of further illustration, in the scenario depicted in FIG. 2B, content update engine 144 can identify pricing information within the search results (e.g., "$499," "$450," etc., as shown) and can further determine (e.g., based on comparison with subsequent pricing information) when such price(s) (e.g., the lowest displayed price) decreases by more than a defined threshold (e.g., 10%). It should be understood that a change or decrease in such content (here, price) above the referenced threshold can reflect a change associated with such a query ("DSLR Camera . . . ") that may be of particular interest/relevance to the user that provided the query.

At operation 460, the content update (e.g., as identified at operation 450) is provided (e.g., to the user/device). In certain implementations, such a content update can be provided or otherwise directed to a content presentation interface that executes on the device (e.g., for presentation in accordance with a content presentation specification). As noted above, such a content presentation interface can be, for example, a dedicated application (e.g., content presentation application 112, as shown in FIG. 1). By way of further example, such a content presentation interface can be a portion of an interface element such as tile 308A within navigation panel 306A, as depicted in FIG. 3A. Accordingly, upon providing the referenced content update (e.g., as identified at operation 450) to a device associated with the user, the content update can be presented at the device (e.g., at a content presentation interface that executes on a device) in accordance with the content presentation specification (e.g., as provided at operation 434).

For example, in the scenario depicted in FIG. 3A, a content update (e.g., that the score of the New York-San Francisco game has changed) can be provided or otherwise directed to device 110A (e.g., a content presentation interface that executes on the device). By way of illustration, in certain implementations such a content update can be provided to a dedicated application 312 that utilizes content presentation specification 114A to define the formatting, appearance, etc. in which the update is to be formatted/presented. By way of further illustration, the received content update can be provided to a region/tile 308A that utilizes content presentation specification 114A to define the formatting, appearance, etc. in which the update is to be formatted/presented. By way of yet further example, the received content update can be provided to device 1100A for presentation as notification 304A that utilizes content presentation specification to define the formatting, appearance, etc. of the notification 304A. In doing so, the content update provided to/received by the device/user in accordance with the visual characteristics defined in the content presentation specification 114 associated with such an update.

At operation 470, an expiration of the content update instance (e.g., as generated at operation 440) is determined. As noted above, the referenced content update instance can be generated based on various predictions or projections of future content update(s) associated with a search query (and/or the frequency of such updates). Accordingly, an expiration of the content update instance can be determined, reflecting a chronological interval (e.g., a date, time, etc.) at which such content updates may no longer be relevant or of interest to the user.

By way of illustration, in the scenario depicted in FIGS. 2A and 3A, an end date associated with the search query ("baseball playoffs") can be determined. Such an end date (reflecting the conclusion of an event) can be determined or received, for example, from a third-party service 128 (e.g., a calendar/scheduling service containing information regarding the dates of public events). For example, it can be determined that the baseball playoffs concluded on Nov. 2, 2016.

By way of further illustration, in the scenario depicted in FIGS. 2B and 3B, an expiration associated with the search query ("DSLR Camera . . . ") can be determined. Such an expiration (reflecting that updates pertaining to the search query may no longer be relevant to the user) can be determined or received, for example, from a third-party service 128 (e.g., an ecommerce site or platform). For example, upon determining that the user has initiated an action, transaction, etc. with respect to a product associated with the referenced query (e.g., purchased the item), subsequent content updates associated with the query may no longer be relevant.

At operation 480, the content update instance (e.g., as generated at operation 440) can be disabled or deactivated. In certain implementations, such a content update instance can be disabled or deactivated based on the expiration (as determined at operation 470). For example, upon determining that the baseball playoffs concluded on Nov. 2, 2016, a content update instance corresponding to the query "baseball playoffs" can be deactivated after such date. By way of further example, upon determining that the user purchased an item corresponding to the query "DSLR Camera . . . ," a content update instance corresponding to the query can be deactivated. In doing so, subsequent content updates associated with the referenced query may not be provided/presented in the manner described herein. Such functionality can be advantageous, for example, in scenarios in which a user is interested in ongoing content updates for a defined period of time (e.g., during the baseball playoffs, etc.), but is not likely to be interested in such updates after a corresponding event, etc. has concluded.

At operation 490, another content update instance is generated. In certain implementations, such a content update instance can be generated with respect to the user (e.g., the user that provided the search query at operation 410). Moreover, in certain implementations such a content update instance can be generated based on various content update parameter(s) (e.g., as identified at operation 420).

For example, as described in detail herein, in the scenario depicted in FIGS. 2A and 3A, a first content update instance can be generated with respect to query 272A ("baseball playoffs"). Such a content update instance can reflect projected content update(s) through the duration of the baseball playoffs for the year 2016. Upon conclusion of the corresponding event (here, the baseball playoffs), content updates associated with such a content update instance can be disabled (e.g., at operation 480). However, based on the referenced content update instance (here, updates associated with the baseball playoffs of 2016), another content update instance (corresponding to updates associated with the baseball playoffs of 2017, for example), can be generated. In doing so, future updates can be accounted for, e.g., in scenarios in which content updates occur on a periodic (e.g., annual) basis.

Figure 5:
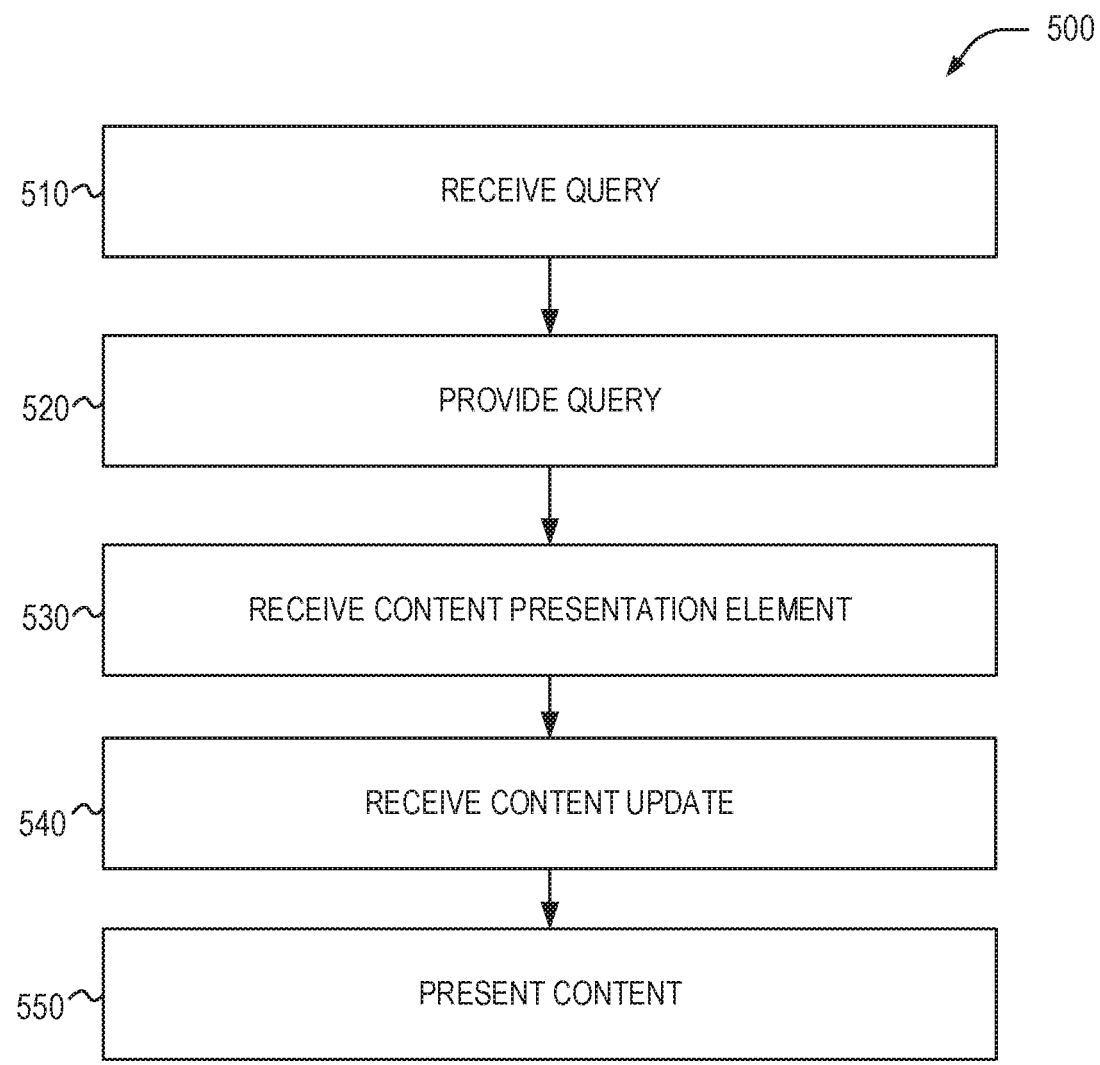
FIG. 5 is a flow chart illustrating a method, in accordance with an example embodiment, for search-initiated content updates.

FIG. 5 is a flow chart illustrating a method 500, according to an example embodiment, for search-initiated content updates. The method is performed by processing logic that can comprise hardware (circuitry, dedicated logic, etc.), software (such as is run on a computing device such as those described herein), or a combination of both. In one implementation, the method 500 is performed by one or more elements depicted and/or described in relation to FIG. 1 (including but not limited to device 110A, and/or content presentation application 112), while in some other implementations, the one or more blocks of FIG. 5 can be performed by another machine or machines.

At operation 510, a search query is received, e.g., from a user. Such a search query can be received from the user at a device 110. For example, as shown in FIG. 2A and described herein, a user can provide search query 272A ("baseball playoffs") within a search interface of application 216 (here, a web browser).

In certain implementations, various aspects of operation 510 (as well as the other operations described with respect to FIG. 5) are performed by device 110A, and/or content presentation application 112 (e.g., as depicted in FIG. 1). In other implementations, such aspects can be performed by one or more other elements/components, such as those described herein.

At operation 520, the search query (e.g., as received at operation 510) is provided to a search service (e.g., search engine 142 of server 140), as described herein. For example, in the scenario depicted in FIG. 2A, upon receiving search query 272A within application 216 (e.g., a web browser) executing on device 110A, such a search query 272A can be transmitted by device 110A to server 140, e.g., via network 120 as shown in FIG. 1. In doing so, search engine 142 can identify search results associated with such query 272A and provide such results to device 110A (e.g., for presentation within application 216).

At operation 530, a content presentation specification is received. Such a content presentation specification can be associated with the search query. Additionally, in certain implementations such a content presentation specification can be received in response to the search query. As described herein, such content presentation specification(s) (e.g., content presentation specification 114A as shown in FIG. 1) can define or dictate various parameters, settings, etc., that define the structure, location, formatting, appearance, and/or other visual characteristics with respect to which content updates (e.g., updates relating to the search query received at operation 510) are to be presented.

For example, content presentation specification 114A can be a file, object, set of instructions/parameters, etc. that defines the manner in which certain content updates (e.g., those pertaining to a search query 272A) are to be presented within a content presentation interface of the device. Such a content presentation interface can be, for example, a dedicated application or portion of an interface element (e.g., a tile or section of a navigation panel provided by the operating system of the device). Accordingly, received content updates can be presented within various content presentation interfaces (dedicated application, tile within a navigation panel, etc.) in accordance with the visual characteristics defined in the content presentation specification associated with such an update. By way of illustration, content presentation specification 114A can define visual characteristics with respect to which updates pertaining to one search query (e.g., changes to the score of a sports game) are to be presented, while content presentation specification 114B can define visual characteristics with respect to which updates pertaining to another search query (e.g., changes to the price of an item for sale) are to be presented.

In certain implementations, the referenced content presentation specification can be generated based on various content elements such as those that make up a web page or other such interface within which the search query and/or search results are provided. For example, FIG. 2A depicts webpage 218A as presented within browser 216. As shown in FIG. 2A, webpage 218A (within which search query 272A is provided by the user) presents and/or otherwise incorporates various content elements in order to present search results (and related content) in response to the query. For example, webpage 218A includes content element(s) 222A which can reflect or incorporate content such as HTML code, images, dynamic/interactive elements, etc. provided within webpage 218A in response to the submitted search query. Accordingly, such content elements (e.g., content elements 222A) can be utilized to generate the referenced content presentation specification (e.g., content presentation specification 114A as shown in FIG. 1). For example, the HTML code from webpage 218A that corresponds to content elements 222A ('Live Scores.' 'Top players,' etc.) can be utilized to generate a content presentation specification that reflects comparable or related content formatting, arrangements, etc. Such a content presentation specification can thus define or dictate the manner in which subsequent content updates (pertaining to the referenced search query) are to be presented (e.g., within a standalone app, in a section or tile of a navigation panel, etc., as described herein).

By way of further illustration, content presentation specification 114A (as shown in FIG. 1) can dictate the manner in which certain content updates (e.g., those pertaining to search query 272A as shown in FIG. 2A) are to be presented within a content presentation interface of the device. Examples of such a content presentation interface are depicted in FIG. 3A. For example, as shown in FIG. 3A, a dedicated application 312 can utilize content presentation specification 114A to define the formatting, appearance, etc. in which content updates (and other related information) are to be presented. By way of further example, content presentation specification 114A can define the formatting/appearance, etc. of tile 308A (which presents content updates pertaining to the referenced query) within navigation panel 306A. By way of yet further example, content presentation specification 114A can define the formatting/appearance, etc. of notification 304A (which presents content updates pertaining to the referenced query).

In doing so, upon receiving content updates pertaining to a search query (as described below), such updates can be presented within the described content presentation interface(s) (dedicated application, tile within a navigation panel, etc.) in accordance with the visual characteristics defined in the content presentation specification 114 associated with such an update.

At operation 540, a content update is received. Such a content update can be an update with respect to the search query (e.g., as received at operation 510). For example, as described herein, such a content update can reflect subsequently generated/received content items that correspond to or are otherwise associated with the referenced query. By way of illustration, in the scenario depicted in FIG. 2A, a change in the score of a game during the baseball playoff series can reflect a content update associated with query 272A ("baseball playoffs"). By way of further illustration, in the scenario depicted in FIG. 2B, a change in pricing information (e.g., a price decrease by more than a defined threshold, e.g., 10%) can reflect a content update associated with query 272B ("DSLR Camera . . . ").

Additionally, in certain implementations the referenced content update can be received based on various other search queries (e.g., those originating from the user in addition to the query received at operation 510). For example, in the scenario depicted in FIGS. 2A and 3A, in addition to query 272A ("baseball playoffs"), the user may also have provided another search query (e.g. "New York baseball"). Such additional querie(s) can provide additional information and parameters regarding content updates to be provided to the user (e.g., reflecting a favorite team, etc. of the user).

Moreover, in certain implementations the referenced content update can be received based on various characteristics associated with the user that provided the query. For example, in the scenario depicted in FIGS. 2A and 3A, in addition to query 272A ("baseball playoffs"), the location of the user (e.g., in New York) can also be determined and/or otherwise identified. Such characteristic(s) (e.g., location, etc.) can provide additional information, parameters, etc. regarding content updates to be provided to the user (e.g., reflecting a favorite team, etc. of the user).

At operation 550, the content update (e.g., as received at operation 540) is presented. In certain implementations, such a content update can be presented (e.g., within a content presentation application) in conjunction with a content presentation specification (e.g., as received at operation 530). For example, as described herein in relation to FIGS. 2A and 3A, upon receiving content updates (e.g., reflecting that the score of the 'New York-San Francisco' game has changed), such content updates can be presented in accordance with the corresponding content presentation specification 114.

In certain implementations, such a content update can be presented within a content presentation interface that executes on the device (e.g., in accordance with a content presentation specification). As noted above, such a content presentation interface can be, for example, a dedicated application (e.g., content presentation application 112, as shown in FIG. 1). By way of further example, such a content presentation interface can be a portion of an interface element such as tile 308A within navigation panel 306A, as depicted in FIG. 3A. Accordingly, upon receiving the referenced content update (e.g., at operation 540), the content update can be presented at the device (e.g., at a content presentation interface that executes on a device) in accordance with the content presentation specification (e.g., as received at operation 530).

For example, in the scenario depicted in FIG. 3A, a content update (e.g., that the score of the New York-San Francisco game has changed) can be received at device 110A. In certain implementations, such a received content update can be presented at a dedicated application 312 that utilizes content presentation specification 114A to define the formatting, appearance, etc. in which the update is to be formatted/presented. By way of further illustration, the received content update can be presented at a region/tile 308A that utilizes content presentation specification 114A to define the formatting, appearance, etc. in which the update is to be formatted/presented. By way of yet further example, the received content update can be presented at device 110A as notification 304A that utilizes content presentation specification to define the formatting, appearance, etc. of the notification 304A. In doing so, the content update received by the device (e.g., at operation 540) can be presented in accordance with the visual characteristics defined in the content presentation specification 114 associated with such an update.

It should also be noted that while the technologies described herein are illustrated primarily with respect to search-initiated content updates, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, there a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the general, non-programmed machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/ storage 630, and I/O components 650, which can be configured to communicate with each other such as via a bus 602. In an example implementation, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fit signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A server computing system comprising:
   a processing deviccprocessor; and
   memory storing an online search service that, when executed by the processor, causes the processor to perform acts comprising:
   receiving, at the server computing system and by way of a network, a user search query from a device associated with a user;
   determining, based upon the search query, a content update parameter that indicates that content associated with the search query is subject to being updated;
   generating a content presentation specification that contains information on visual presentation of updates to the content associated with the search query;
   sending, by way of the network, the content presentation specification to a content presentation interface that executes on the device associated with the user;
   generating, based upon the content update parameter, a content update instance, wherein the online search service monitors for the updates to the content associated with the search query based upon the content update instance;
   storing the content update instance in an update repository comprising at least one other content update instance, wherein the content update instance is associated with the user in the update repository;
   identifying, based upon the content update instance, an update to the content associated with the search query without receiving a resubmission of the search query from the device associated with the user; and
   sending, by way of the network, the update to the content associated with the search query to the content presentation interface that executes on the device for presentation in accordance with the content presentation specification.

2. The server computing system of claim 1, wherein determining the content update parameter comprises comparing the search query with one or more other search queries to project that content updates associated with the search query are likely to be received within a defined chronological interval.

3. The server computing system of claim 1, wherein the content update parameter reflects a frequency with which the search query is received from the device associated with user.

4. The server computing system of claim 1, wherein determining the content update parameter comprises identifying an entity with respect to the search query.

5. The server computing system of claim 1, wherein generating the content update instance comprises projecting a future content update associated with the search query.

6. The server computing system of claim 1, the acts further comprising:
   providing a content update control to the device associated with the user.

7. The server computing system of claim 6, wherein generating the content update instance is based on a selection of the content update control by the user.

8. The server computing system of claim 1, wherein identifying the update to the content associated with the search query comprises searching, based upon the content update instance, a content repository to identify the update to the content associated with the search query.

9. The server computing system of claim 1, wherein identifying the update to the content associated with the search query comprises:
   providing a content update request to a content service; and
   receiving the update to the content associated with the search query from the content service in response to the content update request.

10. The server computing system of claim 1, wherein sending the update to the content associated with the search query comprises sending the update to the content associated with the search query to a content presentation application associated with the device associated with the user.

11. The server computing system of claim 1, the acts further comprising:
   determining an expiration of the content update instance; and
   disabling the content update instance based on the expiration.

12. The server computing system of claim 1, the acts further comprising:
   generating, based upon the content update parameter, a second content update instance, wherein the online search service monitors for the updates to the content associated with the search query based upon the second content update instance with respect to the user without receiving resubmission of the search query.

13. A method performed by a processor of a server computing system while the processor executes an online search service, the method comprising:
receiving, at the server computing system and by way of a network, a search query from a device associated with a user;
determining, based upon the search query, a content update parameter that indicates that content associated with the search query is subject to being updated;
generating a content presentation specification that contains information on visual presentation of updates to the content associated with the search query;
sending, by way of the network, the content presentation specification to a content presentation interface that executes on the device associated with the user;
generating, based upon the content update parameter, a content update instance, wherein the online search service monitors for the updates to the content associated with the search query based upon the content update instance;
identifying, based upon the content update instance, an update to the content associated with the search query without receiving a resubmission of the search query from the device associated with the user; and
sending, by way of the network, the update to the content associated with the search query to the content presentation interface, wherein the content presentation interface presents the update to the content associated with the search query in accordance with the content presentation specification.

14. The method of claim 13, wherein identifying the update to the content associated with the search query is based upon a second search query received from the device associated with the user.

15. The method of claim 13, wherein the update to the content associated with the search query is based upon a characteristic associated with the user.

16. The method of claim 13, wherein the update to the content associated with the search query is presented by a content presentation application in conjunction with the content presentation specification.

17. A hardware data storage device having an online search service stored thereon that, when executed by a processor of a server computing system, causes the processor to perform acts comprising:
receiving, at the server computing system and by way of a network, a search query from a device associated with a user;
determining, based upon the search query, a content update parameter that indicates that content associated with the search query is subject to being updated;
generating a content presentation specification that contains information on visual presentation of the updates to the content associated with the search query;
sending, by way of the network, the content presentation specification to a content presentation interface that executes on the device associated with the user;
generating, based upon the content update parameter, a content update instance based on the content update parameter, wherein the online search service monitors for the updates to the content associated with the search query based upon the content update instance;
identifying, based on the first content update instance, an update to the content associated with the search query without receiving a resubmission of the search query from the device associated with the user; and
sending, by way of the network, the update to the content associated with the search query to the content presentation interface that executes on the device for presentation in accordance with the content presentation specification.

18. The hardware data storage device of claim 17, wherein determining the content update parameter comprises comparing the search query with one or more other search queries.

19. The hardware data storage device of claim 17, the acts further comprising:
determining an expiration of the content update instance; and
disabling the content update instance based on the expiration.

20. The hardware data storage device of claim 17, the acts further comprising:
generating, based on the content update parameter, a second content update instance, wherein the online search service monitors for the updates to the content associated with the search query based upon the second content update instance.

* * * * *